(12) United States Patent
Takasaki et al.

(10) Patent No.: US 9,228,861 B2
(45) Date of Patent: Jan. 5, 2016

(54) ROTATION SENSING APPARATUS AND MANUFACTURING METHOD THEREOF

(71) Applicant: DENSO CORPORATION, Kariya, Aichi-pref. (JP)

(72) Inventors: Mitsuru Takasaki, Obu (JP); Hiroyuki Tsuge, Nisshin (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 13/966,451

(22) Filed: Aug. 14, 2013

(65) Prior Publication Data

US 2014/0053646 A1 Feb. 27, 2014

(30) Foreign Application Priority Data

Aug. 24, 2012 (JP) ................. 2012-185361

(51) Int. Cl.
*G01L 3/10* (2006.01)
*B29C 45/14* (2006.01)
*G01D 11/24* (2006.01)

(52) U.S. Cl.
CPC ................... *G01D 11/245* (2013.01)

(58) Field of Classification Search
CPC ................. B29C 45/14; G01L 3/10
USPC ............................................. 73/431
See application file for complete search history.

(56) References Cited

U.S. PATENT DOCUMENTS

| 8,623,254 B2 * | 1/2014 | Goetz et al. ............. 264/272.11 |
| 2004/0150390 A1 | 8/2004 | Tsuge et al. | |
| 2005/0126308 A1 | 6/2005 | Tsuge et al. | |
| 2010/0207295 A1 | 8/2010 | Goetz et al. | |
| 2013/0106408 A1 | 5/2013 | Tsuge et al. | |

FOREIGN PATENT DOCUMENTS

| JP | 8-128379 | | 5/1996 | |
| JP | 08128379 | A * | 5/1996 | .............. F02P 7/067 |
| JP | 2004-257867 | | 9/2004 | |
| JP | 2004257867 | A * | 9/2004 | ................ G01P 1/02 |
| JP | 2009-058524 | | 3/2009 | |
| JP | 2011-510310 | | 3/2011 | |

OTHER PUBLICATIONS

Office action dated Jun. 12, 2014 in corresponding Japanese Application No. 2012-185361.

* cited by examiner

*Primary Examiner* — Lisa Caputo
*Assistant Examiner* — Jamel Williams
(74) *Attorney, Agent, or Firm* — Harness, Dickey & Pierce, P.L.C.

(57) ABSTRACT

A signal transmitting member is electrically connected to a rotation sensing device and transmits a rotation sensing signal from the rotation sensing device to an external device. An internal structure holds the rotation sensing device and a portion of the signal transmitting member. At least one rib is molded on an outer peripheral surface of the internal structure. The internal structure is integrally molded with a resin material and includes an installing portion, which is configured to install the rotation sensing apparatus to an external subject body through the installing portion, and a holding portion, which is configured to enable holding of the rotation sensing apparatus through the holding portion. A plurality of recesses is formed between the installing portion and the holding portion.

11 Claims, 8 Drawing Sheets

ROTATION SENSING APPARATUS AND MANUFACTURING METHOD THEREOF

CROSS REFERENCE TO RELATED APPLICATION

This application is based on and incorporates herein by reference Japanese Patent Application No. 2012-185361 filed on Aug. 24, 2012.

TECHNICAL FIELD

The present disclosure relates to a rotation sensing apparatus and a manufacturing method thereof.

BACKGROUND

For example, JP2009-058524A (corresponding to US2004/0150390A1) teaches a rotation sensing apparatus, which reliably connects a sensor device to a signal cable. In this rotation sensing apparatus, a transmission cable (serving as a signal transmitting member), which is provided in a first resin member, has a curved portion and is held by the first resin member. Furthermore, a second resin member is molded with a resin material such that the second resin member covers a portion of a housing and the curved portion.

However, with the technique of JP2009-058524A (corresponding to US2004/0150390A1), a process of forming the curved portion of the transmission cable is additionally required. In such a case, the manufacturing time is disadvantageously increased, and the costs are also disadvantageously increased.

In a case where the transmission cable is resin molded in a state where the transmission cable is held to extend linearly without forming the curved portion, the transmission cable may be easily bent or curved by a molding pressure, which is a pressure exerted at the time of molding through filling of a molten resin material into a cavity of a molding die. This possibility of bending is increased when the length of the molding along the transmission cable is increased. In such a case, the transmission cable may be exposed (or projected) from the surface of the first resin member depending on a degree of the bending of the transmission cable.

SUMMARY

The present disclosure addresses the above disadvantages. According to the present disclosure, there is provided a rotation sensing apparatus, which includes a rotation sensing device, a signal transmitting member, an internal structure and at least one rib. The rotation sensing device senses a rotational state of a rotatable body and outputs a rotation sensing signal, which corresponds to the rotational state of the rotatable body. The signal transmitting member is electrically connected to the rotation sensing device and transmits the rotation sensing signal to an external device. The internal structure holds the rotation sensing device and a portion of the signal transmitting member. The at least one rib is molded on an outer peripheral surface of the internal structure. The internal structure is integrally molded with a resin material and includes an installing portion and a holding portion. The installing portion is configured to install the rotation sensing apparatus to an external subject body through the installing portion. The holding portion is configured to enable holding of the rotation sensing apparatus through the holding portion at a time of installing the rotation sensing apparatus to the external subject body. A plurality of recesses is formed between the installing portion and the holding portion.

According to the present disclosure, there is also provided a manufacturing method of a rotation sensing apparatus that includes a rotation sensing device, a signal transmitting member, an internal structure and at least one rib. The rotation sensing device senses a rotational state of a rotatable body and outputs a rotation sensing signal, which corresponds to the rotational state of the rotatable body. The signal transmitting member is electrically connected to the rotation sensing device and transmits the rotation sensing signal to an external device. The internal structure holds the rotation sensing device and a portion of the signal transmitting member. The at least one rib is molded on an outer peripheral surface of the internal structure. According to the manufacturing method, the rotation sensing device and the signal transmitting member are retained in place after a plurality of lead frames of the rotation sensing device is joined to the signal transmitting member. Thereafter, the internal structure is integrally molded with a resin material such that the internal structure includes an installing portion, which is configured to install the rotation sensing apparatus to an external subject body through the installing portion, and a holding portion, which is configured to enable holding of the rotation sensing apparatus through the holding portion at a time of installing the rotation sensing apparatus to the external subject body, and a plurality of recesses is formed between the installing portion and the holding portion.

A configuration of the rotatable body may be any configuration, such as a circular disk form, an annular form (a doughnut form or a ring form) or a cylindrical form. The rotational state may be a state, which relates to the rotation and may include a rotational speed and/or a rotational angle. Furthermore, the rotational state may include a stop state. The rotation sensing device may include a sensor element and a signal processing device. The sensor element and the signal processing device may be integrally provided or separately provided as long as the signal can be transmitted through the sensor element and the signal processing device. The sensor element may be any element or device as long as the sensor element can sense the rotation of the rotatable body. For example, the sensor element may be a magnetic sensor or a sonic sensor. The signal processing device may have a function of outputting a rotation sensing signal in a form of a predetermined signal format (e.g., a pulse signal, a digital data signal or an analog signal) after processing the sensed signal, which is sensed with the sensor element. The signal transmitting member may be any member as long as the signal transmitting member can transmit the rotation sensing signal. For example, the signal transmitting member may be a wire, an electric line (including shield lines), an electric cable or an optical cable. The resin material may be any suitable resin material as long as the resin material can be molded into a corresponding predetermined shape. The external device may be any processing device, such as an electronic control unit (ECU) or a computer, which can process the rotation sensing signal. The joining may include connecting of corresponding parts together by, for example, welding, brazing, crimping or bending.

BRIEF DESCRIPTION OF THE DRAWINGS

The drawings described herein are for illustration purposes only and are not intended to limit the scope of the present disclosure in any way.

DETAILED DESCRIPTION

An embodiment of the present disclosure will be described with reference to the accompanying drawings. In the following discussion, the term "connecting" means "electrically connecting" unless otherwise stated. Each drawing indicates required components, which are required to describe the present disclosure. In other words, each drawing does not necessarily show every feature of an actual rotation sensing apparatus. Furthermore, in the following discussion, directional terms, such as an upper side, a lower side, a left side and a right side are used only with reference to the drawings and are not necessarily related to an installed state of the actual rotation sensing apparatus.

Figure 1:
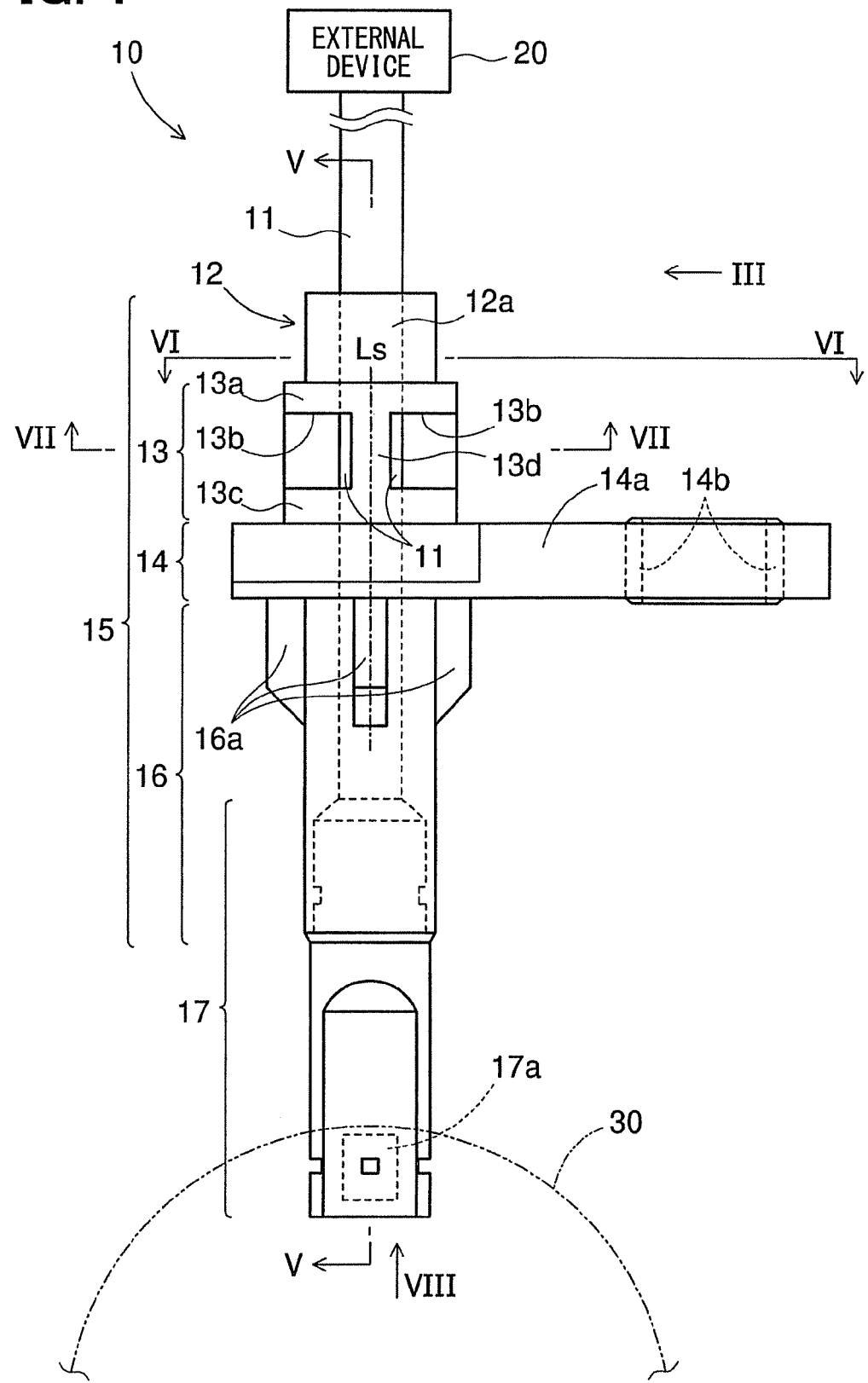
FIG. 1 is a front view of a rotation sensing apparatus according to an embodiment of the present disclosure.
Figure 2:
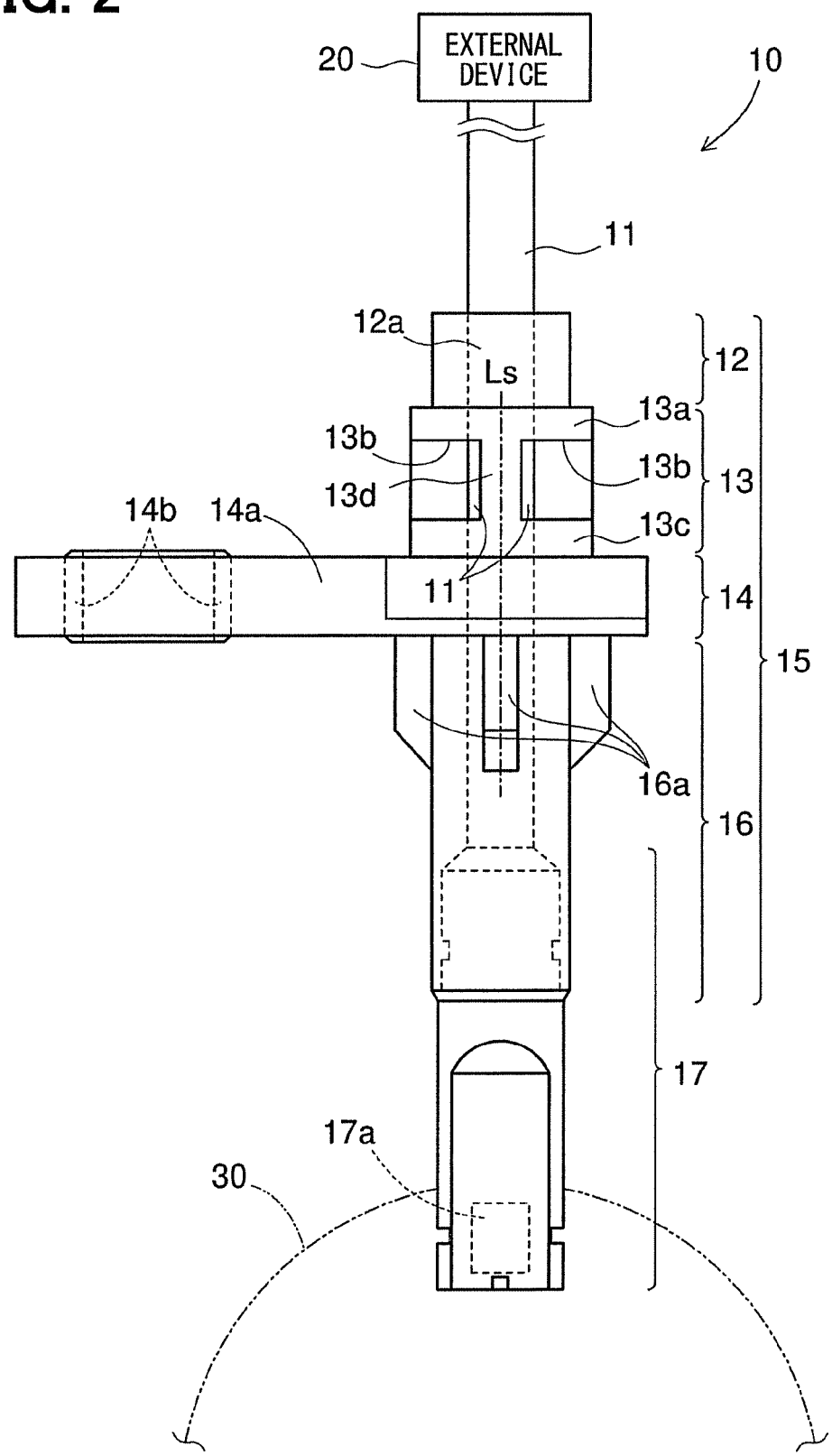
FIG. 2 is a rear view of the rotation sensing apparatus of the embodiment.
Figure 3:
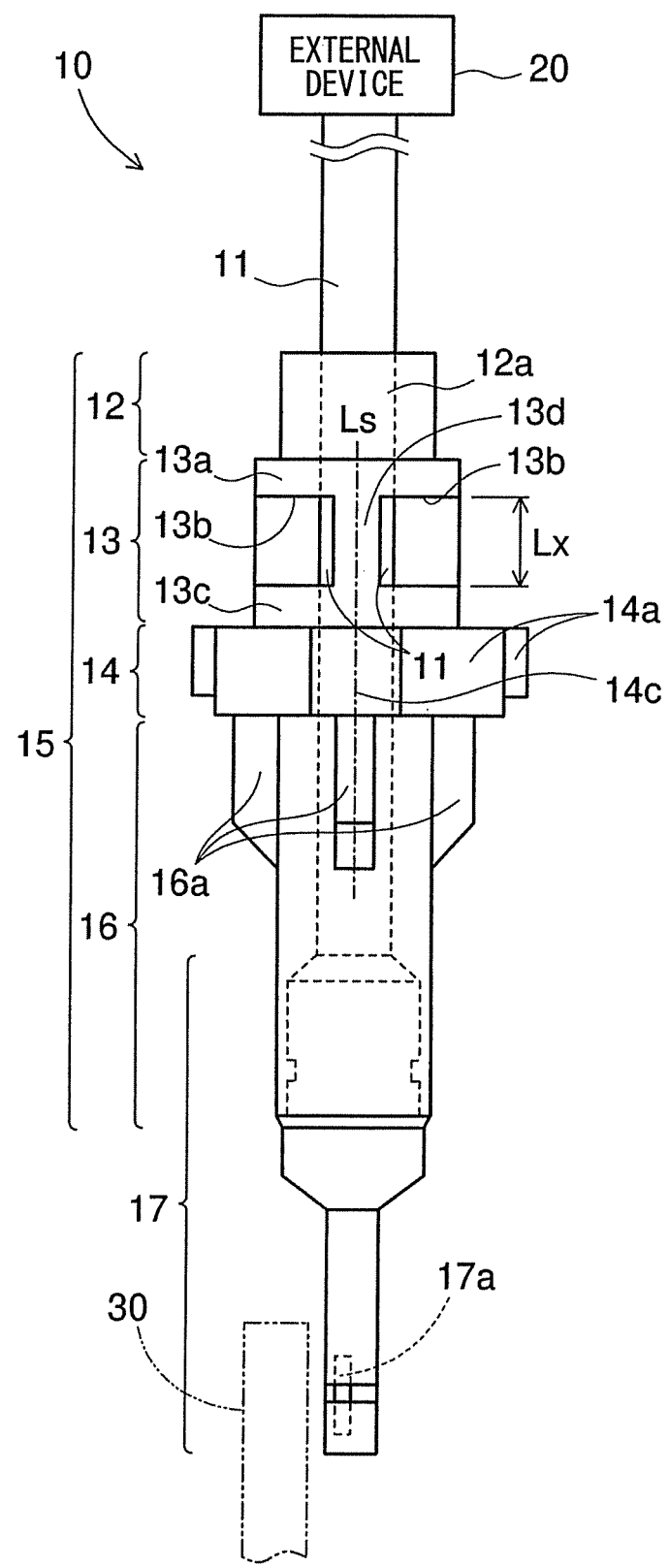
FIG. 3 is a lateral view of the rotation sensing apparatus of the embodiment.

As shown in FIGS. 1 to 3, the rotation sensing apparatus 10 includes a signal transmitting member 11, an internal structure 15 and a rotation sensing device 17a. In the following discussion, the rotating sensing apparatus 10 will be mainly discussed with reference to FIG. 1 while referring to FIGS. 2 and 3 for describing undepicted parts, which are not shown in FIG. 1. Furthermore, in the following discussion, a sensing surface 17b side of the rotation sensing device 17a will be described as a front side. The rotation sensing apparatus 10 of FIG. 1 is molded with a molding machine.

The molding machine may be any type of molding machine as long as the rotation sensing apparatus 10 can be integrally molded. For example, the molding machine may be an injection molding machine or a compression molding machine. The rotation sensing apparatus 10 is positioned and installed to an external subject body (e.g., a frame, a chassis, a housing or an underframe) through use of one or more of fixing elements, such as a bushing 14b and ribs 16a described below. Also, any other fixing means may be used to install the rotation sensing apparatus 10 to the subject body. For instance, the fixing means may be a fastening member(s), such as a bolt(s) or a screw(s). Alternatively, the fixing means may be a bonding agent. In the following discussion, the components of the rotation sensing apparatus 10 will be described.

Figure 4:
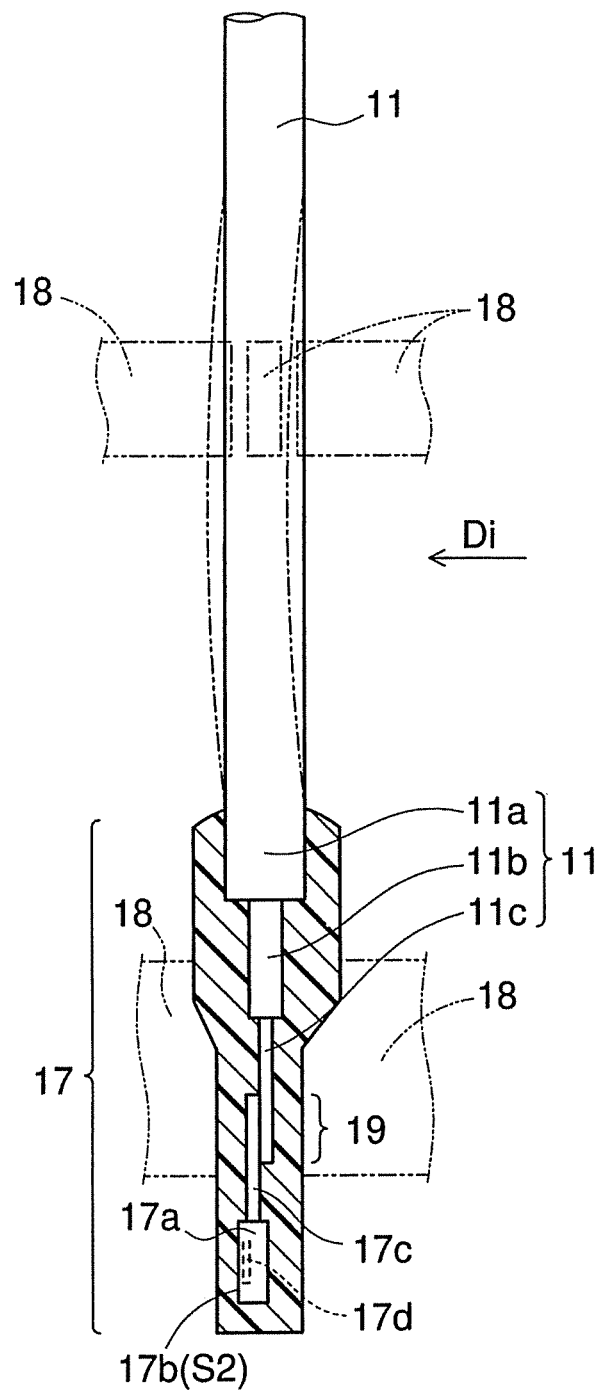
FIG. 4 is a schematic cross-sectional view showing a retaining process in a manufacturing method of the rotation sensing apparatus according to the embodiment.

The signal transmitting member 11 is a member that is electrically connected to the rotation sensing device 17a and conducts a rotation sensing signal from the rotation sensing device 17a to an external device 20. The signal transmitting member 11 is an example of an electric line (electric cable). Specifically, as shown in FIG. 4, the signal transmitting member 11 has two electric wires 11c, two cover members (inner cover members) 11b and a cover member (outer cover member) 11a. Each of the cover members 11b covers a corresponding one of the wires 11c to provide an electric insulation between the wire 11c and the cover member 11a. The cover member 11a provides an electric insulation between the cover members 11b and the outside of the cover members 11b and is molded to hold the wires 11c, which are covered with the cover members 11b, respectively.

A configuration of each wire 11c may be any suitable configuration. In the present embodiment, an end portion of the electric wire 11c is configured into a plate form. The end portion of the wire 11c includes a connection, which is joined to a corresponding one of lead frames 17c of the rotation sensing device 17a. Specifically, the wire 11c is made of a plurality of fine conductive lines (core lines), which are twisted and are welded together by, for example, resistance welding or ultrasonic welding. Although not depicted, each cover member 11b may be covered with shield lines (or simply referred to as a shield) to limit influence of external noises to the rotation sensing signal.

The internal structure 15 serves as a main body of the rotation sensing apparatus 10. The internal structure 15 includes a portion of the signal transmitting member 11, a holding portion 12, a limiting portion 13, an installing portion 14, an underhead portion 16 and a portion of a housing 17, which are molded integrally with a resin material. The rotation sensing device 17a is included in the housing 17.

A type of the resin material, which is used in this integral molding, may be any suitable dielectric resin material as long as the dielectric resin material has an electric insulating property. For example, the dielectric resin material may be a thermoset resin material (a resin material, which forms a polymer network upon irreversible polymerization by curing), a thermoplastic resin material (a resin material, which becomes soft upon heating to a glass transition temperature or a melting point and then becomes a solid state of an intended shape upon cooling), and/or any other suitable type of resin material. The dielectric resin material may be a mixture of different types of resin materials, if desired. Alternative to or in mixture with the above described resin material(s), a fiberglass reinforced plastic may be used. The finer reinforced plastic may be, for example, glass fiber reinforced plastic or carbon fiber reinforce plastic.

The holding portion 12 is a portion, which is held by, for example, a tool or a robot hand at the time of installing the rotation sensing apparatus 10 to the subject body. Here, it should be noted that the limiting portion 13 may be held by, for example, the tool or the robot hand along with the holding portion 12. Although the configuration of the holding portion 12 can be any configuration, the holding portion 12 is configured into a quadrangular prism form in this embodiment. A planar surface part 12a (a molding surface S1), which forms one surface (side surface) of the quadrangular prism, is parallel to the sensing surface (a reference surface S2) of the rotation sensing device 17a (see FIG. 5). Here, the term "parallel" includes "absolutely parallel" as well as "non-parallel of a certain degree", which is within a range of admissible error (e.g., a manufacturing tolerance). Like in the case of the present embodiment, when there are other planar surface parts, which are other than the planar surface part 12a, the planar surface part 12a may be differentiated from the other planar surface parts by a collar, marking or a protrusion (or recess).

The limiting portion 13 includes a plurality of flanges 13a, 13c, a plurality of recesses 13b and a plurality of projections 13d. The limiting portion 13 is formed between the holding portion 12 and the installing portion 14 and is configured generally into a cylindrical form as an entire view of the limiting portion 13. The recesses 13b and the projections 13d are alternately arranged one after another in the circumferential direction. The flange 13a and the flange 13c are opposed to each other in a longitudinal direction of the signal transmitting member 11 (an axial direction, i.e., a top-to-bottom direction in the drawings) while the recesses 13b are interposed between the flange 13a and the flange 13c in the longitudinal direction of the signal transmitting member 11. Each recess 13b has a predetermined extent (length) Lx in the longitudinal direction of the signal transmitting member 11 (see FIG. 3). In other words, the flange 13a and the flange 13c are spaced from each other by the predetermined length Lx in the longitudinal direction of the signal transmitting member 11. The recesses 13b limit a positional deviation of the rotation sensing apparatus 10 in the longitudinal direction of the signal transmitting member 11. In the present embodiment, the signal transmitting member 11 is partially exposed in the recesses 13b. Depending on a molding pressure in the integral molding process, the resin material may possibly enter a gap between the signal transmitting member 11 and corresponding one or more of retaining members 18 (see FIG. 4) to cause formation of a thin film 13e of the resin material, which is indicated by a dot-dot-dash line in FIG. 5, on a part(s) of the surface of the signal transmitting member 11 or the entire surface of the signal transmitting member 11.

A configuration of each recess 13b may be any suitable configuration. Also, the number of the recesses 13b may be any suitable number. The configuration of each recess 13b depends on the configuration of the corresponding retaining member 18. That is, as long as the retaining member 18 can be removed from the recesses 13b, the configuration of each recess 13b can be any suitable configuration. In other words, the configuration of each recess 13b may be any suitable configuration that is other than an undercut (i.e., a feature that cannot be molded using only a single pull mold). In a case where an even number of the recesses 13b is formed, these recesses 13b may be substantially symmetrically arranged about a central axis Lc of the internal structure 15 (see FIG. 5). Here, the term "substantially symmetrical arrangement" includes "absolutely symmetrical arrangement" as well as "non-symmetrical arrangement of a certain degree", which is within a range of admissible error (e.g., a manufacturing tolerance). In a case where an odd number of the projections 13d is formed, the recesses 13b are non-symmetrically arranged. However, in such a case, the recesses 13b may be arranged at generally equal angular intervals about the central axis Lc. The generally equal angular intervals include the absolutely equal intervals as well as non-equal intervals, which are within a range of an admissible error. This is also similarly applicable to the ribs 16a discussed later.

Figure 6:
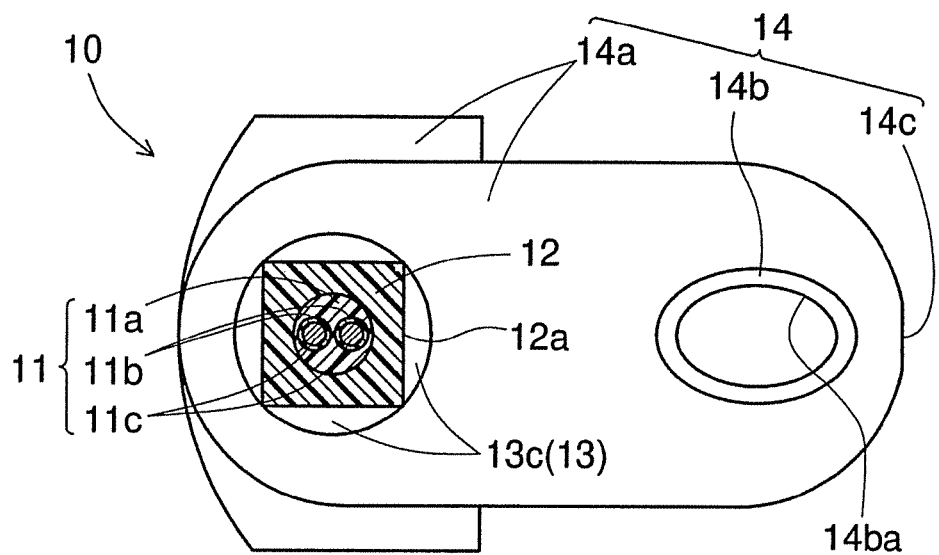
FIG. 6 is a cross-sectional view taken along line VI-VI in FIG. 1.
Figure 8:
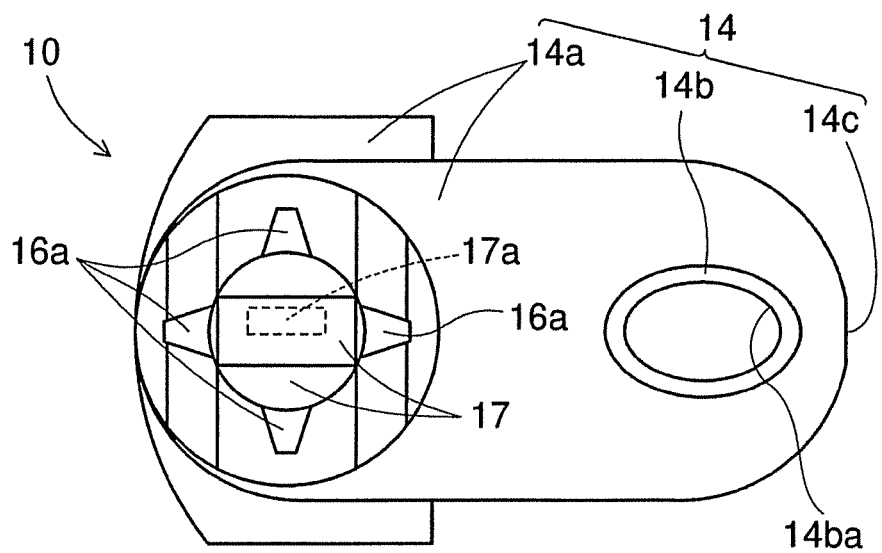
FIG. 8 is a view taken in a direction of an arrow VIII in FIG. 1.

The installing portion 14, which is also referred to as a stay, is a portion that is used to fix the rotation sensing apparatus 10 to the subject body. The installing portion 14 includes a main body 14a. The bushing 14b and a side surface part 14c are formed at the main body 14a (see FIG. 3). A hole 14ba extends through the bushing 14b. A configuration of the hole 14ba may be any suitable configuration. In FIGS. 6 and 8, the hole 14ba is configured into an ellipsoidal shape. However, the hole 14ba may be configured to have any other shape, such as a circular shape or a polygonal shape (e.g., a triangular shape, a quadrangular shape or a hexagonal shape). In the present embodiment, the hole 14ba is the through-hole. Alternatively, the hole 14ba may be a blind hole. Although a material of the bushing 14b can be any suitable material (e.g., a metal material or a resin material), the metal material is used as the material of the bushing 14b in the present embodiment. As is obvious from FIGS. 1 to 3, other than the installing portion 14, the internal structure 15 is symmetrical.

The underhead portion 16 is a portion that is formed between the installing portion 14 and the housing 17. A portion of the housing 17 is formed integrally with and is held by the underhead portion 16. Furthermore, the ribs 16a are arranged one after another in the circumferential direction in an outer peripheral surface of the underhead portion 16. The ribs 16a minimize a contact surface area of the rotation sensing apparatus 10 relative to a metal member of the vehicle (e.g., a knuckle arm) to limit formation of rust on the metal member. Furthermore, the orientation (rotation) of the rotation sensing apparatus 10 can be limited with the ribs 16a.

The ribs 16a are pieces that radially outwardly project from the internal structure 15. The number of the ribs 16a can be any number that is equal to or larger than one. However, when the number of the ribs 16a is increased, the required amount of resin material is increased. Therefore, in reality, the number of ribs 16a may be several. In the present embodiment, the number of the ribs 16a is four. The number of the ribs 16a, the symmetrical arrangement of the ribs 16a and the circumferential intervals of the ribs 16a are similar to those discussed with reference to the projections 13d.

Particularly, in the case where the number of the ribs 16a is the same as the number of the projections 13d, each of the ribs 16a and a corresponding one of the projections 13d should be arranged to extend along a corresponding reference line (a corresponding imaginary line) Ls shown in FIGS. 1 to 3. In FIGS. 1 to 6, a wall thickness (circumferential wall thickness) of each rib 16a and a wall thickness (circumferential wall thickness) of each projection 13d are different from each other. Alternatively, the wall thickness of each rib 16a and the wall thickness of each projection 13d may be made equal to each other. Furthermore, the wall thickness of each rib 16a and the wall thickness of each projection 13d may be made constant along an entire axial extent thereof. Alternatively, the wall thickness of each rib 16a and the wall thickness of each projection 13d may be varied along the axial extent thereof by, for example, tapering the rib 16a and the projection 13d.

In the state where the wires 11c of the signal transmitting member 11 are joined to the lead frames 17c, respectively, of the rotation sensing device 17a, the housing 17 is molded into a predetermined configuration with a resin material (see FIG. 4). The resin material of the housing 17 may be the same or different from the resin material used in the integral molding discussed above. The melting point of the resin material of the housing 17 may be set to be lower than the melting point of the resin material of the internal structure 15. With this setting, the surface of the housing 17 will be molten at the time of integral molding of the internal structure 15.

The rotation sensing device 17a has the function of sensing the rotational state of the rotatable body 30 and outputs the corresponding rotation sensing signal, which corresponds to the sensed rotational state of the rotatable body 30, to the external device 20. The rotation sensing device 17a includes the lead frames 17c (see FIG. 4), a sensor element 17d (see FIGS. 4 and 5) and a signal processing device. The lead frames 17c are electrical conductive members, which conduct the rotation sensing signal. The lead frames 17c may be any suitable conductive members as long as an electrical connection can be made. The position (including a position of a projecting surface, a position of an exposed surface) of the lead frames 17c, a configuration of the lead frames 17c and the number of the lead frames 17c can be freely set. The sensor element 17d senses the rotational state of the rotatable body 30, which is indicated by a dot-dot-dash line in the drawings. A type of the sensor element 17d may vary depending on a type of the rotatable body 30. For instance, in a case where the rotatable body 30 has a magnetic encoder, the sensor element 17d will be a magnetic sensor. The signal processing device may be any suitable signal processing device as long as the signal processing device can output the rotation sensing signal based on the rotational state of the rotatable body 30, which is sensed with the sensor element 17d. Also, the signal processing device may be a packaged signal processing device or may be not the packaged signal processing device, depending on a need. The signal processing device may include one or more of a semiconductor chip (e.g., one-chip microcomputer, IC, LSI), a circuit device (a capacitor, a resistor) and a circuit board.

The external device 20 may be any suitable external device as long as the external device can receive the rotation sensing signal from the rotation sensing device 17a through the signal transmitting member 11 and can process information with respect to the rotation (e.g., a rotational speed, a rotational angle). For example, the external device 20 may be an electronic control unit (ECU) or a computer, and a structure and a location of the external device 20 can be freely designed. The rotatable body 30 may be any suitable rotatable body as long as the rotatable body is rotatable. For example, the rotatable body 30 may be, for example, a gear rotor, which is installed to an axle of the vehicle, a magnetic rotor, which is installed to a hub bearing of the vehicle, or a magnetic encoder of a dynamo-electric machine (e.g., an electric generator, an electric motor, a motor-generator).

Figure 5:
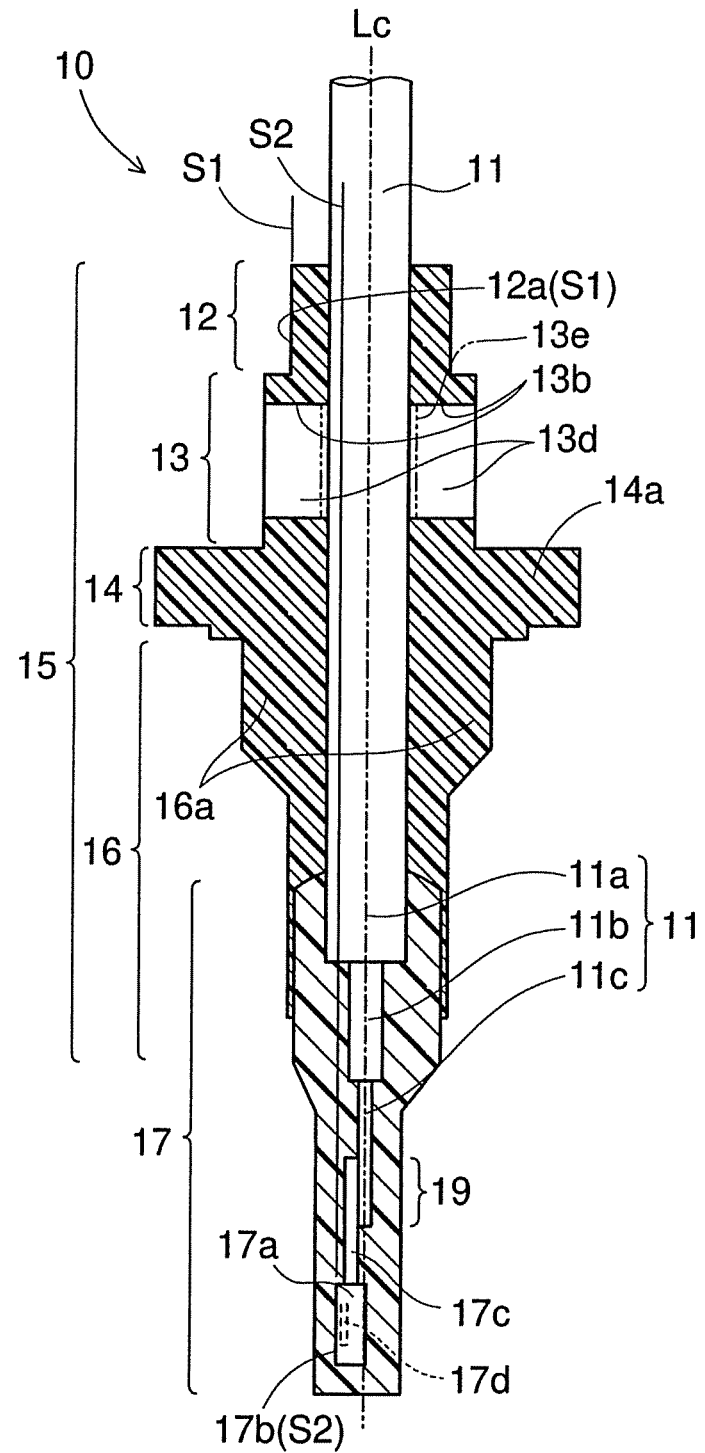
FIG. 5 is a schematic cross-sectional view showing an integral molding process in the manufacturing method of the rotation sensing apparatus according to the embodiment.

The manufacturing method of the rotation sensing apparatus 10 will be described with reference to FIGS. 4 and 5. However, it should be noted that in order to show the recesses 13b, the cross section of the limiting portion 13 of FIG. 5 is taken from an angle that is different from the rest of the rotation sensing apparatus 10 of FIG. 5. The manufacturing method of the rotation sensing apparatus 10 according to the present embodiment includes a joining process, a housing molding process, a retaining process and an integral molding process. In the following discussion, a specific example of each process will be described. It is assumed that the joining process of joining the lead frames 17c to the wires 11c and the housing molding process of molding the housing 17 with the resin material have been already completed.

(Retaining Process)

In the retaining process shown in FIG. 4, the signal transmitting member 11 and the housing 17 are retained together in place before the execution of the integral molding process. The retaining process can be performed in an inside or an outside of the molding machine. The housing 17 includes a joined portion 19 (a joined portion, at which each of the lead frames 17c is joined to the corresponding one of the wires 11c), the rotation sensing device 17a and the portion of the signal transmitting member 11. As shown in FIG. 4, the signal transmitting member 11 is held by the corresponding retaining members 18, and the housing 17 is held by the other corresponding retaining members 18. Particularly, the retaining of the signal transmitting member 11 with the retaining members 18 limits the molding of the internal structure 15 in a bent state where the internal structure 15 is bent, as indicated by a dot-dot-dash line in FIG. 4. That is, at the integral molding process, even when a molding pressure of the resin material, which is filled in a cavity of the molding die in a predetermined direction (e.g., a direction of an arrow D1), is applied to the signal transmitting member 11, the signal transmitting member 11 maintains the linear state (the straight state) of the signal transmitting member 11.

(Integral Molding Process)

The integral molding process shown in FIG. 5 is a process of molding the internal structure 15 in a state where the signal transmitting member 11 and the housing 17 are retained in place at the retaining process discussed above. Specifically, as shown in FIG. 4, in the state where the signal transmitting member 11 and the housing 17 are held by the retaining members 18, the molten resin material is filled into a molding die at the molding machine to integrally mold the internal structure 15. When the integral molding process is completed, the retaining members 18 are removed. Thereby, the rotation sensing apparatus 10 shown in FIGS. 1 to 3 is formed. Therefore, the recesses 13b, which are included in the limiting portion 13, can be considered as traces of the retaining member 18, which indicate that the signal transmitting member 11 is once held by the retaining member 18 at the time of the integral molding.

The exemplary structure of the rotation sensing apparatus 10, which is formed through the above-discussed processes, will be described with reference to FIGS. 6 to 8. First of all, as shown in FIG. 6, the holding portion 12 is configured into a quadrangular prism form, which has a quadrangular cross-section (more specifically a square cross-section in this instance). The flange 13c of the limiting portion 13 is molded and is configured to have a circular cross-section, and a diameter of the circular cross-section of the flange 13c is the same as a length of a diagonal line of the quadrangular cross-section of the holding portion 12. The signal transmitting member 11 is placed to extend through a center part of the holding portion 12 and a center part of the limiting portion 13 to form the internal structure 15. The internal structure 15 may be molded such that the planar surface part 12a and the side surface part 14c are parallel to each other.

Figure 7:
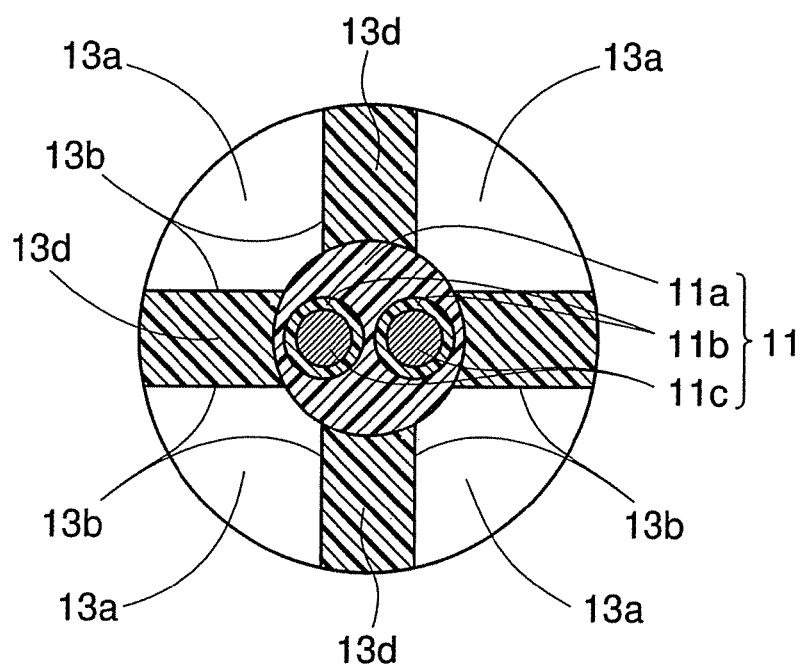
FIG. 7 is a cross-sectional view taken along line VII-VII in FIG. 1.

As shown in FIG. 7, the four projections 13d are molded to form a crisscross shape. The four projections 13d and the four recesses 13b are alternately arranged one after another in the circumferential direction. The outer peripheral surface of the signal transmitting member 11 is exposed externally at each recess 13b. Similar to the flange 13c of FIG. 6, the flange 13a of the limiting portion 13 is configured to have a circular cross-section, and an outer peripheral surface of the flange 13a is generally flush with an outer peripheral surface of each of the projections 13d. In other words, the outer peripheral surface each projection 13d is configured to be arcuate. Therefore, the limiting portion 13 has a cylindrical configuration when the limiting portion 13 is viewed as a whole.

An upper side of FIG. 8 is a front side of the rotation sensing apparatus 10, and a lower side of FIG. 8 is a rear side of the rotation sensing apparatus 10. The four ribs 16a of FIG. 8 radially outwardly project from the outer peripheral surface of the underhead portion 16 and are arranged one after another at about 90 degree intervals in the circumferential direction. The ribs 16a may be configured into any appropriate configuration. In the example of FIG. 8, each rib 16a is tapered toward its radially outer end to have tapered surfaces. Therefore, a circumferential thickness of the rib 16a progressively decreases toward its radially outer end. A plane of each of corresponding two of the ribs 16a (left and right ribs 16a in FIG. 8), which are parallel to each other, may be configured to be generally parallel to the sensing surface 17b (the reference surface S2) of the rotation sensing device 17a.

The above-discussed embodiment achieve the following advantages.

(1) According to the present embodiment, as shown in FIGS. 1 to 3 and 5, the rotation sensing apparatus 10 includes the rotation sensing device 17a, the signal transmitting member 11, the internal structure 15 and the ribs 16a. The rotation sensing device 17a senses the rotational state of the rotatable body 30 and outputs the rotation sensing signal, which corresponds to the rotational state of the rotatable body 30. The signal transmitting member 11 is electrically connected to the rotation sensing device 17a and transmits the rotation sensing signal to the external device 20. The internal structure 15 holds the rotation sensing device 17a and the portion of the signal transmitting member 11. The ribs 16a are molded on the outer peripheral surface of the internal structure 15. The internal structure 15 is integrally molded with the resin material and includes the installing portion 14, which is configured to install the rotation sensing apparatus 10 to the external subject body through the installing portion 14, and the holding portion 12, which is configured to enable holding of the rotation sensing apparatus 10 through the holding portion 12 at the time of installing the rotation sensing apparatus 10 to the external subject body. The recesses 13b are formed between the installing portion 14 and the holding portion 12. With the above construction, the recesses 13b are the traces of the retaining members 18, which indicate that the signal transmitting member 11 is once held by the retaining members 18 at the time of the integral molding. In other words, when the signal transmitting member 11 and the housing 17 (including the rotation sensing device 17a) are retained, i.e., held, the linear state of the signal transmitting member 11 can be maintained during the integral molding process even upon application of the molding pressure to the signal transmitting member 11.

(2) The holding portion 12 includes the at least one planar surface part 12a. One (the molding surface S1) of the at least one planar surface part 12a is generally parallel to the sensing surface 17b (the reference surface S2) of the rotation sensing device 17a (see FIG. 5). With the above construction, the planar surface part 12a and the sensing surface 17b are generally parallel to each other. Thus, the planar surface part 12a can be used as the reference at the time of automatic assembling to enable easy positioning of the sensing surface 17b. Although not depicted, the molding surface S1 and the reference surface S2 may be formed to define a predetermined angle θ (e.g., 0°<θ<360°) therebetween depending on the positional relationship relative to the rotatable body 30. Even in such a case, the positioning of the sensing surface 17b can be made easily.

(3) The signal transmitting member 11 is externally exposed at the recesses 13b, or the resin material is molded as the thin film 13e on the surface of the signal transmitting member 11 (see FIGS. 5 and 7). With the above construction, the recesses 13b are the traces of the retaining member 18, which indicate that the signal transmitting member 11 is once held by the retaining member 18 at the time of the integral molding (see FIG. 4). Therefore, the integral molding process can be performed such that the signal transmitting member 11 maintains the linear state of the signal transmitting member 11.

(4) The portion (more specifically, the limiting portion 13) of the internal structure 15, at which the recesses 13b are molded, is molded such that the recesses 13b and the projections 13d are alternately arranged one after another in the circumferential direction to form the cylindrical configuration at the portion (the limiting portion 13) of the internal structure 15 by the plurality of recesses 13b and the at least one projection 13d. With this construction, the amount of the molding resin material used in the integral molding process can be reduced by the corresponding amount, which corresponds to the volume of the recesses 13b. Thereby, the weight of the rotation sensing apparatus 10 can be reduced, and the manufacturing costs of the rotation sensing apparatus 10 can be reduced. Furthermore, the limiting portion 13 of the internal structure 15 is formed into the cylindrical configuration, so that the limiting portion 13 can be held or clamped together with the holding portion 12.

(5) Each of the projections 13d and a corresponding one of the ribs 16a extend along the reference line (the corresponding common imaginary line) Ls, as shown in FIGS. 1 to 3. With this construction, even if one of the projection 13d and the rib 16b can be not viewed, the orientation of the rotation sensing apparatus 10 can be checked with the other one of the projection 13d and the rib 16b. Therefore, at least one of the projection 13d and the rib 16a can be used to install the rotation sensing apparatus 10 to the external subject body.

(6) The projections 13d and the ribs 16a are generally symmetrically arranged about the central axis Lc of the internal structure 15 (see FIG. 5). Since the projections 13d and the ribs 16a are generally symmetrically arranged, the signal transmitting member 11 can be held along the central axis Lc of the internal structure 15.

(7) The flange 13a, 13c is formed to extend circumferentially at each of the axial end sides of the recesses 13b. Alternatively, the flange 13a, 13c may be formed to extend circumferentially at only one of the axial end sides of the recesses 13b. With the above construction, the movement of the rotation sensing apparatus 10 in the longitudinal direction is limited by one or both of the flanges 13a, 13c, so that the unintentional removal of the rotation sensing apparatus 10 in the longitudinal direction thereof can be limited.

(8) The recesses 13b are formed to extend for the predetermined length Lx in the longitudinal direction of the signal transmitting member 11. With the above construction, in a case where a length of a member to be fitted to the recesses 13b after the installation of the rotation sensing apparatus 10 to the external subject body is denoted as "La", the positional deviation of the rotation sensing apparatus 10 can be limited to its maximum value of |Lx−La|.

(9) In the manufacturing method of the rotation sensing apparatus 10, the rotation sensing device 17a and the signal transmitting member 11 are retained in the state where the lead frames 17c of the rotation sensing device 17a are joined to the signal transmitting member 11. Then, the internal structure 15 is integrally molded with the resin material such that the internal structure 15 includes the installing portion 14, which is configured to install the rotation sensing apparatus 10 to the external subject body through the installing portion 14, and the holding portion 12, which is configured to enable holding of the rotation sensing apparatus 10 through the holding portion 12 at the time of installing the rotation sensing apparatus 10 to the external subject body, and the recesses 13b are formed between the installing portion 14 and the holding portion 12 (see FIGS. 4 and 5). In the above-described manner, similar to the above discussion at the item (1), the rotation sensing apparatus 10 can be formed through the integral molding process while maintaining the linear state of the signal transmitting member 11 even upon application of the molding pressure to the signal transmitting member 11.

(10) The integral molding process includes molding the holding portion 12 such that the planar surface part 12a (the molding surface S1) is held generally parallel to the sensing surface 17b (the reference surface S2) of the rotation sensing device 17a (see FIG. 5). In this manner, similar to the above discussion at the item (2), the positioning of the sensing surface 17b can be easily performed. The molding surface S1 and the reference surface S2 may be angled relative to each other by a predetermined angle θ. Even in such a case, the positioning of the sensing surface 17b can be easily performed.

(11) The integral molding process includes molding the internal structure 15 having the limiting portion 13, at which the recesses 13b and the projections 13d are alternately arranged one after another in the circumferential direction to form the cylindrical configuration of the limiting portion 13 of the internal structure by the recesses 13b and the projections 13d (see FIGS. 5 and 7). In this manner, similar to the above discussion at the item (4), the weight of the rotation sensing apparatus 10 is reduced, and the manufacturing costs of the rotation sensing apparatus 10 can be further reduced. Furthermore, the limiting portion 13 can be held or clamped together with the holding portion 12.

(Modifications)

The present disclosure is discussed with reference to the above embodiment. However, the present disclosure is not limited to the above embodiment. That is, the above embodiment may be modified in various ways within the principle of the present disclosure. For example, the following modifications may be made.

Figure 9:
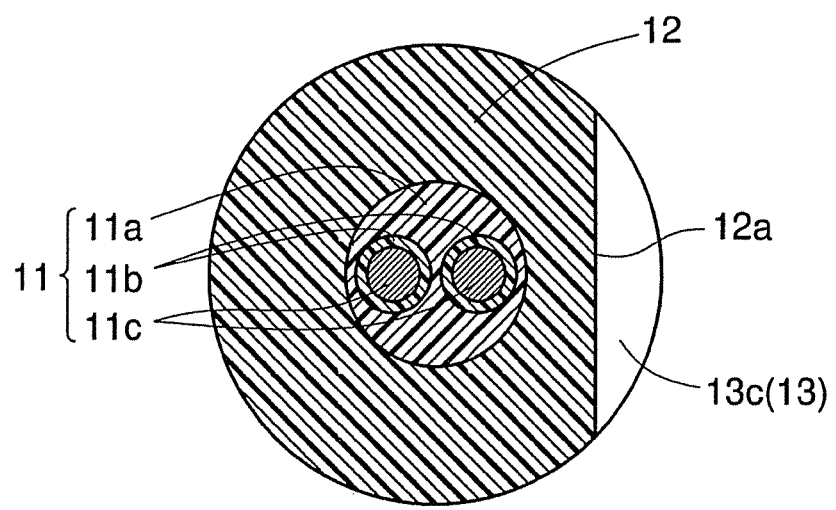
FIG. 9 is a partial cross-sectional view of a first modification of the rotation sensing apparatus of the embodiment, showing an enlarged cross-section of the holding portion taken along a plane similar to that of FIG. 6.
Figure 10:
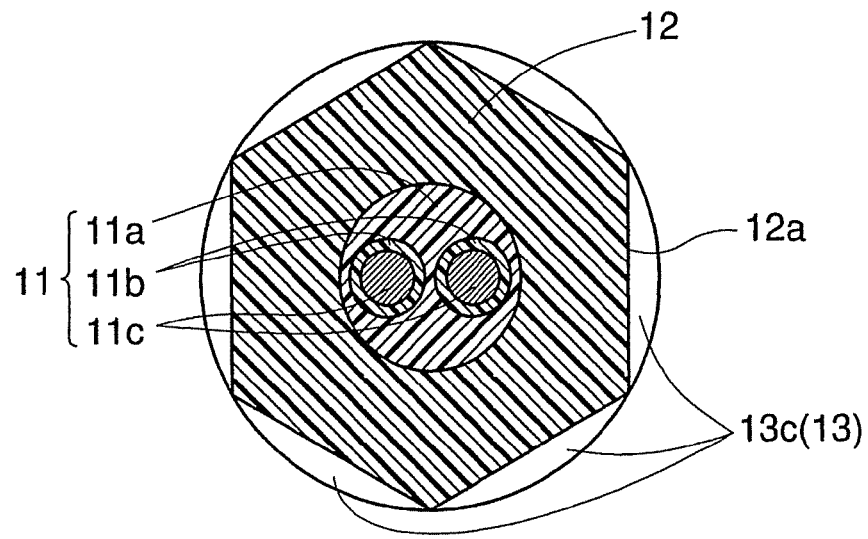
FIG. 10 is a partial cross-sectional view of a second modification of the rotation sensing apparatus of the embodiment, showing an enlarged cross-section of the holding portion taken along a plane similar to that of FIG. 6.

In the above embodiment, the holding portion 12 is configured into the quadrangular prism form, which has the quadrangular cross-section (see FIG. 6). The holding portion 12 may be modified into any other suitable form as long as the planar surface part 12a (the molding surface S1) is formed in the holding portion 12. For example, as shown in FIG. 9, the holding portion 12 may be configured into a cylindrical body having the diameter that is the same as that of the limiting portion 13. Alternatively, the holding portion 12 may be formed to have a different diameter that is different from the diameter of the limiting portion 13. Furthermore, besides the planar surface part 12a, the holding portion 12 may further include one or more other planar surface parts, which are similar to the planar surface part 12a. Furthermore, with reference to FIG. 10, the holding portion 12 may be molded into any other polygonal prism form (a prism having a polygonal cross section, which includes three or more sides) except the quadrangular prism. In FIG. 10, the holding portion 12 is configured into a hexagonal prism, and one of six sides of the hexagonal prism serves as the planar surface part 12a. As long as the holding portion 12 has the planar surface part 12a, the holding portion 12 may be molded into any desired shape because the planar surface part 12a is generally parallel to the sensing surface 17b or is angled by the predetermined angle θ relative to the sensing surface 17b. Thus, the positioning of the sensing surface 17b can be made easily.

Figure 11:
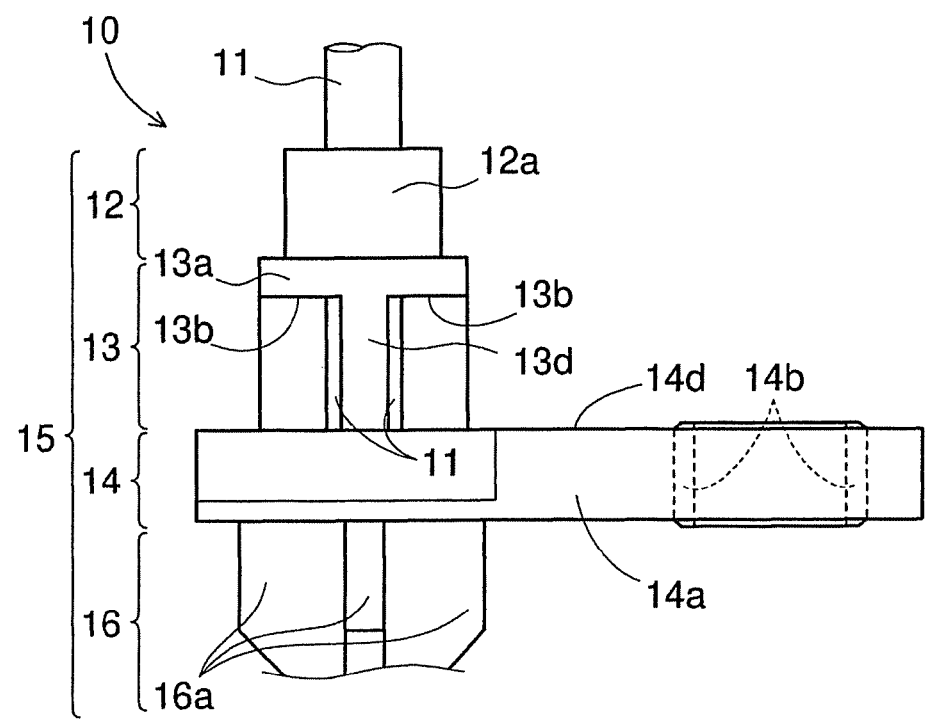
FIG. 11 is a partial front view of a third modification of the rotation sensing apparatus of the embodiment.

In the above embodiment, the flanges 13a, 13c are provided at the two axial end sides, respectively, of the recesses 13b (see FIGS. 1 to 3 and 5). Alternative to this construction, with reference to FIG. 11, the flange 13a may be provided only at the one of the two axial end sides of the recesses 13b. FIG. 11 only shows the part of FIG. 1. In the structure of FIG. 11, the flange 13c is replaced with the installing portion 14 (specifically, an upper surface part 14d). With the above construction, the movement of the rotation sensing apparatus 10 in the longitudinal direction is limited by the flange 13a and the installing portion 14, so that the unintentional removal of the rotation sensing apparatus 10 in the longitudinal direction thereof can be limited.

In the above embodiment, the projections 13d and the ribs 16a are generally symmetrically arranged about the central axis of the internal structure 15 (see FIG. 5). Alternative to this configuration, only the projections 13d or the ribs 16a may be generally symmetrically arranged about the central axis Lc of the internal structure 15. Since the projections 13d or the ribs 16a are generally symmetrically arranged, the signal transmitting member 11 can be held along the central axis Lc of the internal structure 15.

In the above-discussed embodiment, the sensor element 17d is included in the rotation sensing device 17a (see FIG. 2). Alternative to this embodiment, the sensor element 17d may be provided in the housing 17 separately from the rotation sensing device 17a. In such a case, signal lines (including lead frames), which transmit the signal sensed with the sensor element 17d to the rotation sensing device 17a (particularly the signal processing device), are required. In the joining process, the sensor element 17d and the rotation sensing device 17a need to be joined together. In the housing molding process, the housing 17 needs to be integrally molded with the resin material along with the sensor element 17d. The difference is only about whether the sensor element 17d and the rotation sensing device 17a are integrated or separated. Therefore, the advantages, which are similar to those of the above embodiment can be achieved.

In the above embodiment, the installing portion 14 is formed to extend along the corresponding two ribs 16a (the left and right ribs 16a in FIG. 1). Alternative to this construction, the installing portion 14 may be formed to extend in a direction that is different from the extending direction of the corresponding two ribs 16a. Depending on the position of the installing portion, the installing portion may extend in the direction, which is angled to the extending direction of the corresponding two ribs 16a by an angle θa (0°<θa<180°). Even in any of these constructions, only the structure of the installing portion 14 differs from the one discussed with the above embodiment. Thus, the advantages, which are similar to those of the above embodiment, can be achieved.

Additional advantages and modifications will readily occur to those skilled in the art. The present disclosure in its broader terms is therefore not limited to the specific details, representative apparatus, and illustrative examples shown and described.

What is claimed is:

1. A rotation sensing apparatus comprising:
    a rotation sensing device that senses a rotational state of a rotatable body and outputs a rotation sensing signal;
    a signal transmitting member that is electrically connected to the rotation sensing device and transmits the rotation sensing signal to an external device;
    an internal structure that holds a portion of the signal transmitting member and the rotation sensing device; and
    a rib that is molded on an outer peripheral surface of the internal structure, wherein:
    the internal structure includes an installing portion, which is used to install the rotation sensing apparatus, and a holding portion, which holds the rotation sensing apparatus at a time of installing the rotation sensing apparatus, wherein the internal structure is integrally molded with a resin material;
    a plurality of recesses is formed between the installing portion and the holding portion;
    the holding portion includes at least one planar surface part;
    one of the at least one planar surface part is parallel to a sensing surface of the rotation sensing device or is angled to the sensing surface by a predetermined angle;
    a portion of the internal structure, at which the plurality of recesses is molded, is molded such that the plurality of recesses and a projection, in which none of the plurality of recesses is formed, are alternately arranged one after another in a circumferential direction, and the portion of the internal structure is formed into a cylindrical configuration; and the projection and the rib are molded along a corresponding common line.

2. The rotation sensing apparatus according to claim 1, wherein the signal transmitting member is externally exposed at the plurality of recesses, or the resin material is molded as a thin film on a surface of the signal transmitting member at the plurality of recesses.

3. The rotation sensing apparatus according to claim 1, wherein:
the projection is one of a plurality of projections;
the rib is one of a plurality of ribs; and
one or both of the plurality of projections and the plurality of ribs is generally symmetrically arranged about a central axis of the internal structure.

4. The rotation sensing apparatus according to claim 1, wherein a flange is formed to extend circumferentially at one or both of two sides of the plurality of recesses.

5. The rotation sensing apparatus according to claim 1, wherein the plurality of recesses is molded to extend for a predetermined length in a longitudinal direction of the signal transmitting member.

6. A rotation sensing apparatus comprising:
a rotation sensing device that senses a rotational state of a rotatable body and outputs a rotation sensing signal;
a signal transmitting member that is electrically connected to the rotation sensing device and transmits the rotation sensing signal to an external device;
an internal structure that holds a portion of the signal transmitting member and the rotation sensing device; and
a rib that is molded on an outer peripheral surface of the internal structure, wherein:
the internal structure includes an installing portion, which is used to install the rotation sensing apparatus, and a holding portion, which holds the rotation sensing apparatus at a time of installing the rotation sensing apparatus, wherein the internal structure is integrally molded with a resin material;
a plurality of recesses is formed between the installing portion and the holding portion;
the signal transmitting member is externally exposed at the plurality of recesses, or the resin material is molded as a thin film on a surface of the signal transmitting member at the plurality of recesses;
a portion of the internal structure, at which the plurality of recesses is molded, is molded such that the plurality of recesses and a projection, in which none of the plurality of recesses is formed, are alternately arranged one after another in a circumferential direction, and the portion of the internal structure is formed into a cylindrical configuration; and
the projection and the rib are molded along a corresponding common line.

7. The rotation sensing apparatus according to claim 6, wherein:
the projection is one of a plurality of projections;
the rib is one of a plurality of ribs; and
one or both of the plurality of projections and the plurality of ribs is generally symmetrically arranged about a central axis of the internal structure.

8. The rotation sensing apparatus according to claim 6, wherein a flange is formed to extend circumferentially at one or both of two sides of the plurality of recesses.

9. The rotation sensing apparatus according to claim 6, wherein the plurality of recesses is molded to extend for a predetermined length in a longitudinal direction of the signal transmitting member.

10. A rotation sensing apparatus comprising:
a rotation sensing device that senses a rotational state of a rotatable body and outputs a rotation sensing signal;
a signal transmitting member that is electrically connected to the rotation sensing device and transmits the rotation sensing signal to an external device;
an internal structure that holds a portion of the signal transmitting member and the rotation sensing device; and
a rib that is molded on an outer peripheral surface of the internal structure, wherein:
the internal structure includes an installing portion, which is used to install the rotation sensing apparatus, and a holding portion, which holds the rotation sensing apparatus at a time of installing the rotation sensing apparatus, wherein the internal structure is integrally molded with a resin material;
a plurality of recesses is formed between the installing portion and the holding portion;
the holding portion includes at least one planar surface part;
one of the at least one planar surface part is parallel to a sensing surface of the rotation sensing device or is angled to the sensing surface by a predetermined angle; and
a flange is formed to extend circumferentially at one or both of two sides of the plurality of recesses.

11. A rotation sensing apparatus comprising:
a rotation sensing device that senses a rotational state of a rotatable body and outputs a rotation sensing signal;
a signal transmitting member that is electrically connected to the rotation sensing device and transmits the rotation sensing signal to an external device;
an internal structure that holds a portion of the signal transmitting member and the rotation sensing device; and
a rib that is molded on an outer peripheral surface of the internal structure, wherein:
the internal structure includes an installing portion, which is used to install the rotation sensing apparatus, and a holding portion, which holds the rotation sensing apparatus at a time of installing the rotation sensing apparatus, wherein the internal structure is integrally molded with a resin material;
a plurality of recesses is formed between the installing portion and the holding portion;
the signal transmitting member is externally exposed at the plurality of recesses, or the resin material is molded as a thin film on a surface of the signal transmitting member at the plurality of recesses; and
a flange is formed to extend circumferentially at one or both of two sides of the plurality of recesses.

* * * * *